W. G. STERLING.
Hand Seeder.
No. 10,525.
Patented Feb. 14, 1854.
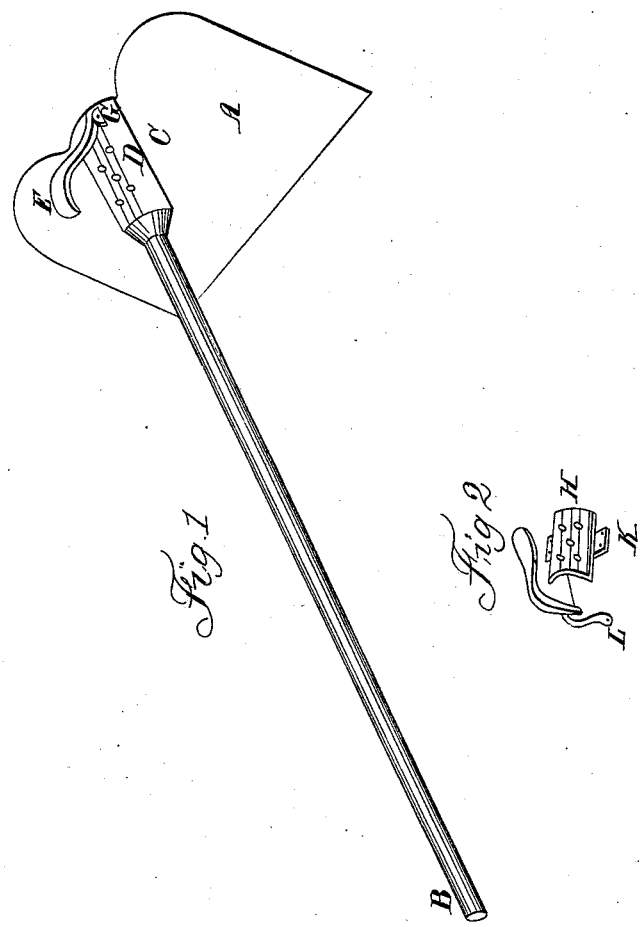
Witnesses:
D. H. Sterling
Stephen S. Stevens
Inventor.
W. G. Sterling

UNITED STATES PATENT OFFICE.

W. G. STERLING, OF BRIDGEPORT, CONNECTICUT.

IMPROVEMENT IN PLANTING-HOES.

Specification forming part of Letters Patent No. 10,525, dated February 14, 1854.

*To all whom it may concern:*

Be it known that I, W. G. STERLING, of Bridgeport, Fairfield county, State of Connecticut, have invented a Corn-Planter, of which the following is a full and correct description, reference being had to the drawings annexed, which form a part of this specification.

Letter A, Figure 1, is the blade of the hoe. B is the handle, formed of a thin metal tube of the ordinary size. About four or five inches in length of this tube (of the end which is attached to the blade of the hoe) is enlarged, as at C, to make a cylinder that will contain about a quart. The upper side of this cylinder is corrugated or fluted to the depth of a kernel of corn, in which is four or five small holes, as shown at D. These holes are sufficiently large to admit a kernel of corn to drop through each of them.

On the heel of the hoe is the small lever or bar E, which vibrates on the pin G. The end of the lever passes into the cylinder, and is attached by means of a wire to a sliding plate, which is corrugated to match that part of the cylinder, and reciprocates under it by means of the lever. This sliding plate has four or five holes in it, as shown in Fig. 2, letter H, and is secured to the inside of the cylinder by the strap K. When the lever is pressed down the holes will be open in the cylinder, and when the lever is up the sliding plate closes them, which is effected by the spring attached to the inner end of the lever, as shown in Fig. 2, letter L. The seed-corn is poured into the open end of the handle, Fig. 1, letter B, in the same manner with the hand as a musket is loaded, and passes into the cylinder C. By inverting the hoe and pressing the lever against the ground the corn will be deposited in the place prepared for it. When the hoe is raised the sliding plate closes the holes and prevents the corn from spilling when the hoe is used for preparing the ground for planting.

I do not claim the blade with a tubular handle attached; neither do I claim the opening and closing an orifice for the discharge of the grain; but

What I claim is—

The cylinder C, in connection with the tubular handle, and the lever E, with the sliding plate attached, as above described, or any other mode equivalent thereto.

W. G. STERLING.

Witnesses:
D. H. STERLING,
STEPHEN S. STEVENS.